(12) United States Patent
Afrouzi

(10) Patent No.: US 10,436,810 B1
(45) Date of Patent: *Oct. 8, 2019

(54) METHOD FOR TRACKING MOVEMENT OF A MOBILE ROBOTIC DEVICE

(71) Applicant: Ali Ebrahimi Afrouzi, San Jose, CA (US)

(72) Inventor: Ali Ebrahimi Afrouzi, San Jose, CA (US)

(73) Assignee: AI Incorporated, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/955,480

(22) Filed: Apr. 17, 2018

(51) Int. Cl.
*G01P 3/80* (2006.01)
*G01P 3/38* (2006.01)
*G01C 22/00* (2006.01)
*G06T 7/254* (2017.01)

(52) U.S. Cl.
CPC .............. *G01P 3/806* (2013.01); *G01C 22/00* (2013.01); *G01P 3/38* (2013.01); *G06T 7/254* (2017.01); *G06T 2207/30241* (2013.01); *G06T 2207/30252* (2013.01)

(58) Field of Classification Search
CPC ........ G01C 21/20; G01C 22/00; B25J 9/1666; B25J 19/023; B25J 5/00; G01P 3/806; G01P 3/38; G06T 7/254; G06T 2007/30252; G06T 2207/30241
See application file for complete search history.

(56) References Cited

U.S. PATENT DOCUMENTS

| 6,240,652 | B1 | 6/2001 | Bobel et al. | |
|---|---|---|---|---|
| 6,804,022 | B2 | 10/2004 | Fujiwara et al. | |
| 7,145,130 | B2 | 12/2006 | Sano | |
| 7,456,815 | B2 | 11/2008 | Reime | |
| 8,546,745 | B2 | 10/2013 | Lippuner | |
| 2004/0193323 | A1* | 9/2004 | Higaki | G06K 9/00348 700/259 |
| 2008/0129829 | A1* | 6/2008 | Shin | H04N 5/23248 348/208.1 |
| 2009/0027544 | A1* | 1/2009 | Grewal | H04N 5/23248 348/352 |
| 2009/0039886 | A1* | 2/2009 | White | G01R 33/28 324/318 |
| 2010/0152897 | A1* | 6/2010 | Muller | B25J 5/00 700/259 |
| 2013/0073089 | A1* | 3/2013 | Nakahara | B25J 9/1697 700/259 |
| 2016/0096272 | A1* | 4/2016 | Smith | B25J 9/163 700/253 |
| 2017/0192435 | A1* | 7/2017 | Bakhishev | G05D 1/0246 |

* cited by examiner

*Primary Examiner* — Mekonen T Bekele

(57) ABSTRACT

A method for tracking movement and turning angle of a mobile robotic device using two optoelectronic sensors positioned on the underside thereof. Digital image correlation is used to analyze images captured by the optoelectronic sensors and determine the amount of offset, and thereby amount of movement of the device. Trigonometric analysis of a triangle formed by lines between the positions of the optoelectronic sensors at different intervals may be used to determine turning angle of the mobile robotic device.

25 Claims, 3 Drawing Sheets

METHOD FOR TRACKING MOVEMENT OF A MOBILE ROBOTIC DEVICE

CROSS-REFERENCE TO RELATED APPLICATIONS

This is a continuation-in-part of U.S. patent application Ser. No. 15/425,130 filed Feb. 6, 2017 which is a Non-provisional Patent Application of U.S. Provisional Patent Application No. 62/299,701 filed Feb. 25, 2016 all of which are herein incorporated by reference in their entireties for all purposes.

FIELD OF THE INVENTION

The present invention relates to methods for tracking movement of mobile robotic devices.

BACKGROUND

Mobile robotic devices are being used with increasing frequency to carry out routine tasks, like vacuuming, mopping, cutting grass, painting, etc. It may be useful to track the position and orientation (the movement) of a mobile robotic device so that even and thorough coverage of a surface can be ensured. Many robotic devices utilize SLAM (simultaneous localization and mapping) to determine position and orientation, however SLAM requires expensive technology that may augment the overall cost of the robotic device. Additionally, SLAM requires intensive processing which takes extra time and processing power. A need exists for a simpler method to track the relative movement of a mobile robotic device.

SUMMARY

According to embodiments of the present invention, two (or more) optoelectronic sensors are positioned on the underside of a mobile robotic device to monitor the surface below the device. Successive images of the surface below the device are captured by the optoelectronic sensors and processed by an image processor using cross correlation to determine how much each successive image is offset from the last. From this, a device's relative position may be determined.

DETAILED DESCRIPTION OF THE INVENTION

Figure 1A:
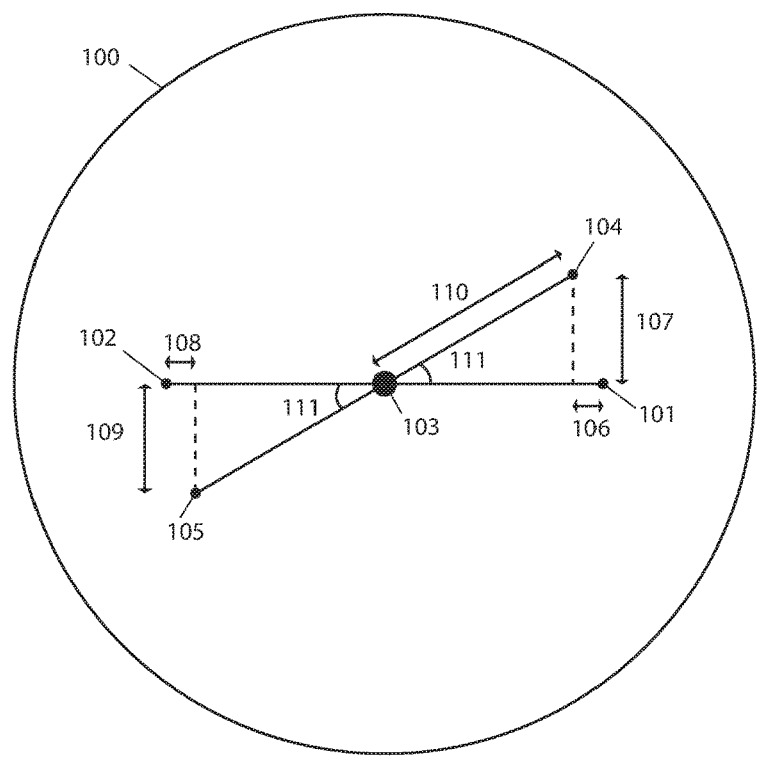
FIGS. 1A-1C illustrate a method for calculating rotation angle given linear movements of two optoelectronic sensors disposed on the underside of the robotic device embodying features of the present invention.

The present invention proposes a method for tracking relative movement of a mobile robotic device through optoelectronic sensors.

According to embodiments of the proposed invention, at least two optoelectronic sensors and a light emitting diode (LED) are positioned on the underside of a mobile robotic device such that they monitor the surface upon which the device drives. In embodiments, an infrared laser diode or other types of light sources may be used. The at least two optoelectronic sensors may be positioned at some distance from one another on the underside of the mobile robotic device. For example, two optoelectronic sensors may be positioned along a line passing through the center of the robotic device, each on opposite sides and at an equal distance from the center of the robotic device. In other instances, the optoelectronic sensors may be positioned differently on the underside of the robotic device, where for example, they may not be at equal distance from the center of the robotic device. The LED illuminates the surface upon which the robotic device drives and the optoelectronic sensors capture images of the driving surface as the robotic device moves through the environment. The images captured are sent to a processor and a technique such as, digital image correlation (DIC), may be used to determine the linear movement of each of the optoelectronic sensors in the x and y directions. Each optoelectronic sensor has an initial starting location that can be identified with a pair of x and y coordinates and using a technique such as DIC, a second location of each optoelectronic sensor can be identified by a second pair of x and y coordinates. In some embodiments, the processor detects patterns in images and is able to determine by how much the patterns have moved from one image to another, thereby providing the movement of each optoelectronic sensor in the x and y directions over a time from a first image being captured to a second image being captured. To detect these patterns and movement of each sensor in the x and y directions the processor mathematically processes these images using a technique such as cross correlation to calculate how much each successive image is offset from the previous one. In embodiments, finding the maximum of the correlation array between pixel intensities of two images may be used to determine the translational shift in the x-y plane or in the case of a robotic device, its driving surface plane. Cross correlation may be defined in various ways. For example, two-dimensional discrete cross correlation $r_{ij}$ may be defined as:

$$r_{ij} = \frac{\Sigma_k \Sigma_l [s(k+i, l+j) - \bar{s}][q(k,l) - \bar{q}]}{\sqrt{\Sigma_k \Sigma_l [s(k,l) - \bar{s}]^2 \Sigma_k \Sigma_l [q(k,l) - \bar{q}]^2}}$$

where s(k,l) is the pixel intensity at a point (k,l) in a first image and q(k,l) is the pixel intensity of a corresponding point in the translated image. $\bar{s}$ and $\bar{q}$ are the mean values of respective pixel intensity matrices s and q. The coordinates of the maximum $r_{ij}$ gives the pixel integer shift.

$$(\Delta x, \Delta y) = \underset{(i,j)}{\operatorname{argmax}}\{r\}$$

In some embodiments, the correlation array may be computed faster using Fourier Transform techniques or other mathematical methods.

Given the movement of each optoelectronic sensor in the x and y directions, the linear and rotational movement of the robotic device may be known. For example, if the robotic device is only moving linearly without any rotation, the translation of each optoelectronic sensor ($\Delta x$, $\Delta y$) over a time $\Delta t$ are the same in magnitude and sign and may be assumed to be the translation of the robotic device as well. If the robotic device rotates, the linear translations of each optoelectronic sensor determined from their respective images may be used to calculate the rotation angle of the robotic device. For example, in some instances the robotic device rotates in place, about an instantaneous center of rotation (ICR) located at its center. This may occur when the velocity of one wheel is equal and opposite to the other wheel (i.e. $v_r = -v_l$, wherein r denotes right wheel and l left wheel). In embodiments wherein two optoelectronic sensors, for example, are placed at equal distances from the center of the robotic device along a line passing through its center, the magnitude of the translations in the x and y directions of the two optoelectronic sensors are the same and of opposite sign. The translations of either sensor may be used to determine the rotation angle of the robotic device about the ICR by applying Pythagorean theorem, given the distance of the sensor to the ICR is known. In embodiments wherein the optoelectronic sensors are placed along a line passing through the center of the robotic device and are not of equal distance from the center of the robotic device, translations of each sensor will not be of the same magnitude however, any set of translations corresponding to an optoelectronic sensor, will result in the same angle of rotation when applying Pythagorean theorem.

The offset amounts at each optoelectronic sensor location may be used to determine the amount that the mobile robotic device turned. FIG. 1A illustrates a top view of robotic device 100 with a first optoelectronic sensor initially positioned at 101 and a second optoelectronic sensor initially positioned at 102, both of equal distance from the center of robotic device 100. The initial and end position of robotic device 100 is shown, wherein the initial position is denoted by the dashed lines. Robotic device 100 rotates in place about ICR 103, moving first optoelectronic sensor to position 104 and second optoelectronic sensor to position 105. As robotic device 100 rotates from its initial position to a new position optoelectronic sensors capture images of the surface illuminated by an LED (not shown) and send the images to a processor for DIC. After DIC of the images is complete, translation 106 in the x direction ($\Delta x$) and 107 in the y direction ($\Delta y$) are determined for the first optoelectronic sensor and translation 108 in the x direction and 109 in the y direction for the second sensor. Since rotation is in place and the optoelectronic sensors are positioned symmetrically about the center of robotic device 100 the translations for both optoelectronic sensors are of equal magnitude. The translations ($\Delta x$, $\Delta y$) corresponding to either optoelectronic sensor together with the respective distance 110 of either sensor from ICR 103 of robotic device 100 may be used to calculate rotation angle 111 of robotic device 100 by forming a right-angle triangle as shown in FIG. 1A and applying Pythagorean theorem:

$$\sin\theta = \frac{\text{opposite}}{\text{hypotneuse}} = \frac{\Delta y}{d}$$

wherein θ is rotation angle 111 and d is known distance 110 of the sensor from ICR 103 of robotic device 100.

Figure 1B:
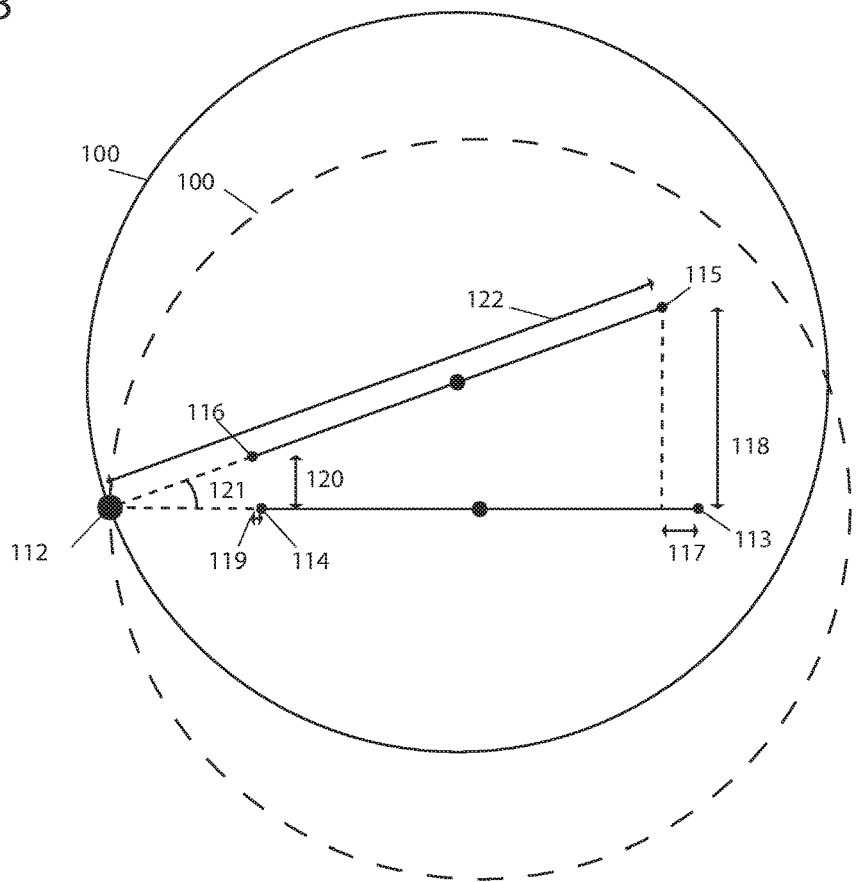

In embodiments, the rotation of the robotic device may not be about its center but about an ICR located elsewhere, such as the right or left wheel of the robotic device. For example, if the velocity of one wheel is zero while the other is spinning then rotation of the robotic device is about the wheel with zero velocity and is the location of the ICR. The translations determined by images from each of the optoelectronic sensors may be used to estimate the rotation angle about the ICR. For example, FIG. 1B illustrates rotation of robotic device 100 about ICR 112. The initial and end position of robotic device 100 is shown, wherein the initial position is denoted by the dashed lines. Initially first optoelectronic sensor is positioned at 113 and second optoelectronic sensor is positioned at 114. Robotic device 100 rotates about ICR 112, moving first optoelectronic sensor to position 115 and second optoelectronic sensor to position 116. As robotic device 100 rotates from its initial position to a new position optoelectronic sensors capture images of the surface illuminated by an LED (not shown) and send the images to a processor for DIC. After DIC of the images is complete, translation 117 in the x direction ($\Delta x$) and 118 in the y direction ($\Delta y$) are determined for the first optoelectronic sensor and translation 119 in the x direction and 120 in the y direction for the second sensor. The translations ($\Delta x$, $\Delta y$) corresponding to either optoelectronic sensor together with the respective distance of the sensor to the ICR, which in this case is the left wheel, may be used to calculate rotation angle 121 of robotic device 100 by forming a right-angle triangle, such as that shown in FIG. 1B. Translation 118 of the first optoelectronic sensor in the y direction and its distance 122 from ICR 112 of robotic device 100 may be used to calculate rotation angle 121 of robotic device 100 by Pythagorean theorem:

$$\sin\theta = \frac{\text{opposite}}{\text{hypotneuse}} = \frac{\Delta y}{d}$$

wherein θ is rotation angle 121 and d is known distance 122 of the first sensor from ICR 112 located at the left wheel of robotic device 100. Rotation angle 121 may also be determined by forming a right-angled triangle with the second sensor and ICR 112 and using its respective translation in the y direction.

Figure 1C:
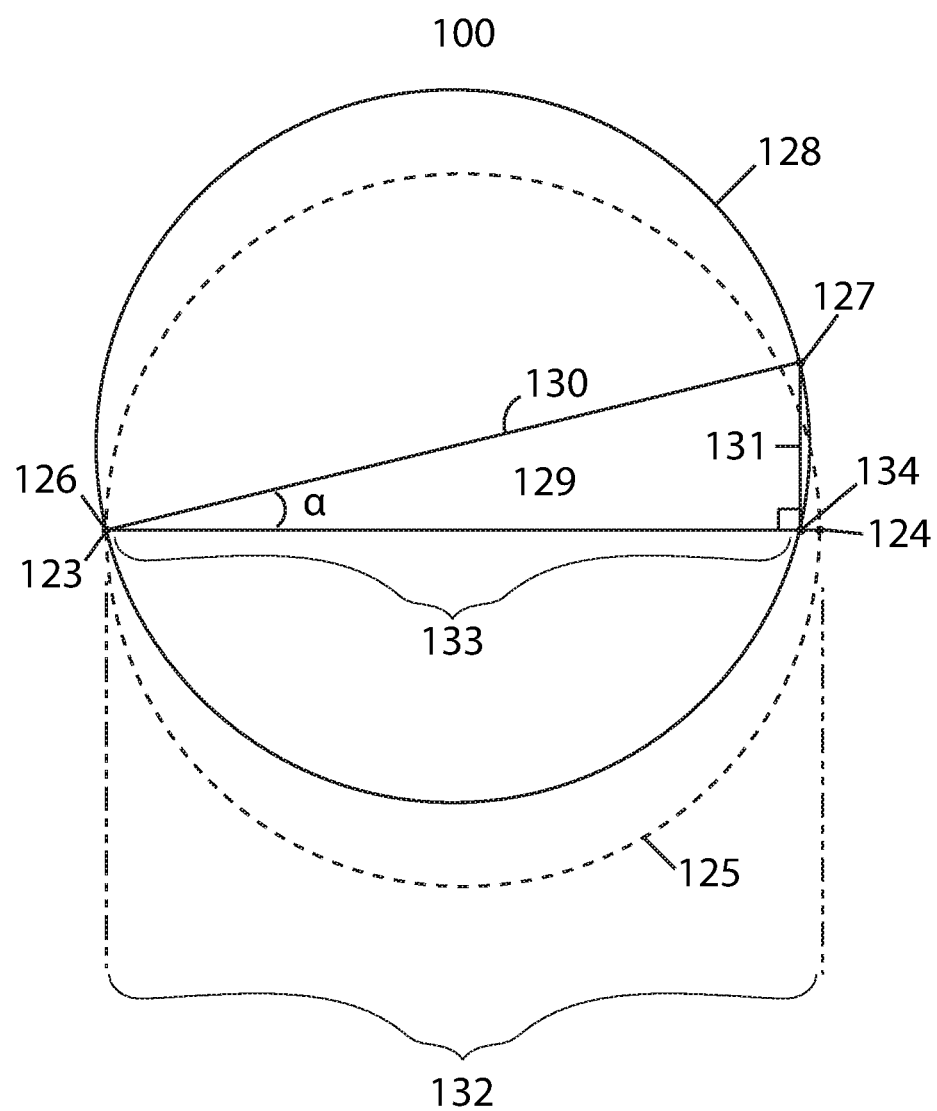

In another example, the initial position of robotic device 100 with two optoelectronic sensors 123 and 124 is shown by the dashed line 125 in FIG. 1C. A secondary position of the mobile robotic device 100 with two optoelectronic sensors 126 and 127 after having moved slightly is shown by solid line 128. Because the secondary position of optoelectronic sensor 126 is substantially in the same position 123 as before the move, no difference in position of this sensor is shown. In real time, analyses of movement may occur so rapidly that a mobile robotic device may only move a small distance in between analyses and only one of the two optoelectronic sensors may have moved substantially. The rotation angle of robotic device 100 may be represented by the angle α within triangle 129. Triangle 129 is formed by:

the straight line 130 between the secondary positions of the two optoelectronic sensors 126 and 127;

the line 131 from the second position 127 of the optoelectronic sensor with the greatest change in coordinates from its initial position to its secondary position to the line 132 between the initial positions of the two optoelectronic sensors that forms a right angle therewith;

and the line 133 from the vertex 134 formed by the intersection of line 131 with line 132 to the initial position 123 of the optoelectronic sensor with the least amount of (or no) change in coordinates from its initial position to its secondary position.

The length of side 130 is fixed because it is simply the distance between the two sensors, which does not change. The length of side 131 may be calculated by finding the difference of the y coordinates between the position of the optoelectronic sensor at position 127 and at position 124. It should be noted that the length of side 133 does not need to be known in order to find the angle α. The trigonometric function:

$$\sin\theta = \frac{\text{opposite}}{\text{hypotneuse}}$$

only requires that we know the length of sides 131 (opposite) and 130 (hypotenuse). After performing the above trigonometric function, we have the angle α, which is the turning angle of the mobile robotic device.

Figure 2:
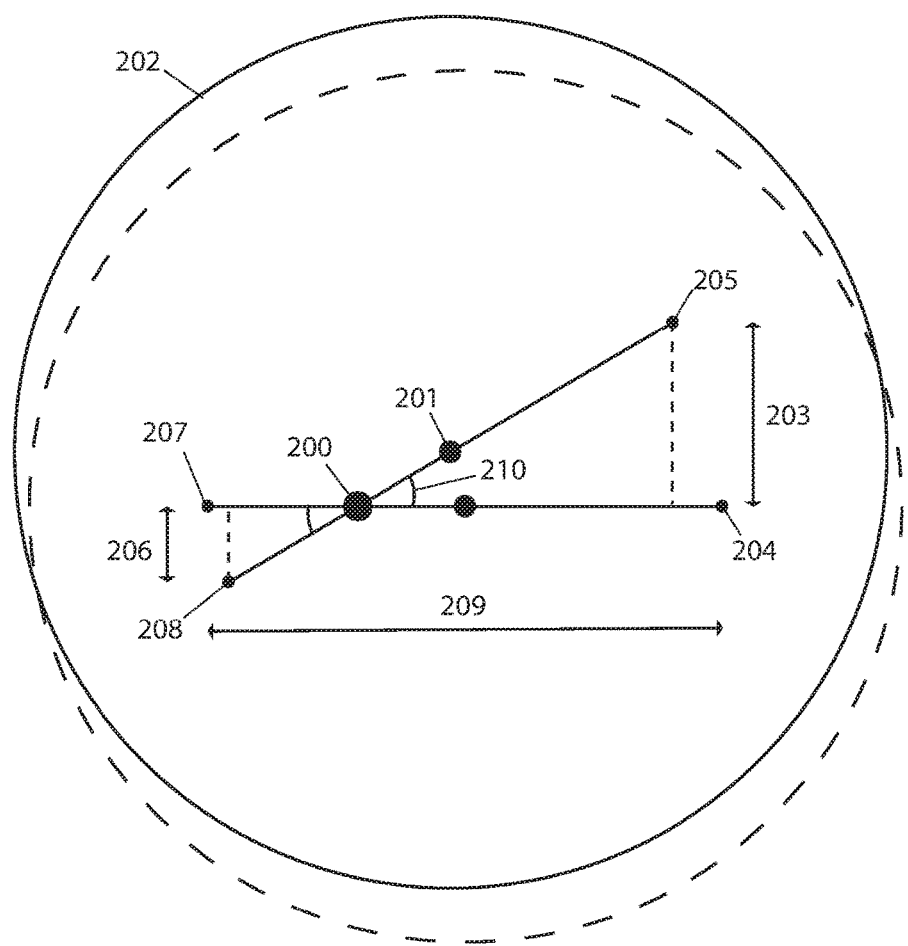
FIG. 2 illustrates a method for calculating rotation angle given linear movements of two optoelectronic sensors disposed on the underside of the robotic device embodying features of the present invention.

In a further example, wherein the location of the ICR relative to each of the optoelectronic sensors is unknown, translations in the x and y directions of each optoelectronic sensor may be used together to determine rotation angle about the ICR. For example, in FIG. 2 ICR 200 is located to the left of center 201 and is the point about which rotation occurs. The initial and end position of robotic device 202 is shown, wherein the initial position is denoted by the dashed lines. While the distance of each optoelectronic sensor to center 201 or a wheel of robotic device 202 may be known, the distance between each sensor and an ICR, such as ICR 200, may be unknown. In these instances, translation 203 in the y direction of first optoelectronic sensor initially positioned at 204 and translated to position 205 and translation 206 in the y direction of second optoelectronic sensor initially position at 207 and translated to position 208, along with distance 209 between the two sensors may be used to determine rotation angle 210 about ICR 200 using the following equation:

$$\sin\theta = \frac{\Delta y_1 + \Delta y_2}{b}$$

wherein θ is rotation angle 210, $\Delta y_1$ is translation 203 in the y direction of first optoelectronic sensor, $\Delta y_2$ is translation 206 in the y direction of second optoelectronic sensor and h is distance 209 between the two sensors.

The methods of tracking linear and rotational movement of a robotic device described herein may be supplemental to other methods used for tracking movement of a robotic device. For example, this method may be used with an optical encoder, gyroscope or both to improve accuracy of the estimated movement or may be used independently in other instances.

In embodiments, given that the time Δt between captured images is known, the linear velocities in the x ($v_x$) and y ($v_y$) directions and angular velocity (ω) of the robotic device may be estimated using the following equations:

$$v_x = \frac{\Delta x}{\Delta t}$$
$$v_y = \frac{\Delta y}{\Delta t}$$
$$\omega = \frac{\Delta \theta}{\Delta t}$$

wherein Δx and Δy are the translations in the x and y directions, respectively, that occur over time Δt and Δθ is the rotation that occurs over time Δt.

In embodiments, one optoelectronic sensor may be used to determine linear and rotational movement of a robotic device using the same methods as described above. The use of at least two optoelectronic sensors is particularly useful when the location of ICR is unknown or the distance between each sensor and the ICR is unknown. However, rotational movement of the robotic device may be determined using one optoelectronic sensor when the distance between the sensor and ICR is known, such as in the case when the ICR is at the center of the robotic device and the robotic device rotates in place (illustrated in FIG. 1A) or the ICR is at a wheel of the robotic device and the robotic device rotates about the wheel (illustrated in FIGS. 1B and 1C).

In embodiments, the optoelectronic sensors and light source, such as an LED, may be combined into a single unit device with an embedded processor or may be connected to any other separate processor, such as that of a robotic device. In embodiments, each optoelectronic sensor has its own light source and in other embodiments optoelectronic sensors may a share light source. In embodiments, a dedicated image processor may be used to process images and in other embodiments a separate processor coupled to the optoelectronic sensor(s) may be used, such as a processor or control system of a robotic device. In embodiments each optoelectronic sensor, light source and processor may be installed as separate units.

In embodiments, a light source, such as an LED, may not be used.

In embodiments, two-dimensional optoelectronic sensors may be used. In other embodiments, one-dimensional optoelectronic sensors may be used. In embodiments, one-dimensional optoelectronic sensors may be combined to achieve readings in more dimensions. For example, to achieve similar results as two-dimensional optoelectronic sensors, two one-dimensional optoelectronic sensors may be positioned perpendicularly to one another. In some instances, one-dimensional and two dimensional optoelectronic sensors may be used together.

I claim:

1. A method for tracking movement of a robotic device comprising:
    Capturing a plurality of images of a driving surface by each of at least two optoelectronic sensors of the robotic device moving within an environment;
    Obtaining, with one or more processors of the robotic device, the plurality of images by each of the at least two optoelectronic sensors;
    Determining, with one or more processors of the robotic device, based on the images captured by each of the at least two optoelectronic sensors, linear movement of each of the at least two optoelectronic sensors; and
    Determining, with one or more processors of the robotic device, based on the linear movement of each of the at least two optoelectronic sensors, rotational movement of the robotic device.

2. The method of claim 1, wherein the linear movement of the at least two optoelectronic sensors is equal to linear movement of the robotic device.

3. The method of claim 1, wherein the linear movement of each of the at least two optoelectronic sensors is determined by maximum cross correlation between successive images captured by each of the at least two optoelectronic sensors.

4. The method of claim 1, further comprising determining linear velocity of the robotic device, by the one or more processors of the robotic device, based on linear movement, of the robotic device and the time between the captured images, the linear movement of the robotic device being estimated from the captured images.

5. The method of claim 1, further comprising determining angular velocity of the robotic device, by the one or more processors of the robotic device, based on linear movement, of the at least two optoelectronic sensors and the time between the captured images, the linear movement of the at least two optoelectronic sensors being estimated from the captured images.

6. The method of claim 1, wherein images captured by each of the at least two optoelectronic sensors overlap with preceding images captured by each of the at least two optoelectronic sensors.

7. The method of claim 1, wherein the driving surface is illuminated by a light source.

8. The method of claim 7, wherein the light source is an LED.

9. A method for tracking velocity of a robotic device comprising:
Capturing a plurality of images of a driving surface by each of at least two optoelectronic sensors of the robotic device moving within an environment;
Obtaining with one or more processors of the robotic device, the plurality of images by each of the at least two optoelectronic sensors; and
Determining, with the one or more processors of the robotic device, based on images captured by each of the at least two optoelectronic sensors, linear movement of each of the at least two optoelectronic sensors.

10. The method of claim 9, further comprising determining linear velocity of the robotic device, by the one or more processors of the robotic device, based on the linear movement of each of the at least two optoelectronic sensors and time between the images captured.

11. The method of claim 9, further comprising determining angular velocity of the robotic device, by the one or more processors of the robotic device, based on the linear movement of each of the at least two optoelectronic sensors and time between the images captured.

12. The method of claim 9, wherein determining the linear movement of each of the at least two optoelectronic sensors further comprises determining maximum cross correlation between successive images captured by each of the at least two optoelectronic sensors.

13. The method of claim 9, wherein the plurality of images captured by each of the at least two optoelectronic sensors overlaps with preceding images captured by each of the at least two optoelectronic sensors.

14. The method of claim 9, wherein the driving surface is illuminated by a light source.

15. The method of claim 14, wherein the light source is an LED.

16. A method for tracking movement of a robotic device comprising:
Capturing a plurality of images of a driving surface by at least one optoelectronic sensor of the robotic device moving within an environment;
Obtaining, with one or more processors of the robotic device, the plurality of images by the at least one optoelectronic sensor;
Determining, with one or more processors of the robotic device, based on the images captured by the at least one optoelectronic sensor, linear movement of the optoelectronic sensor; and
Determining, with one or more processors of the robotic device, based on the linear movement of the at least one optoelectronic sensor, rotational movement of the robotic device.

17. The method of claim 16, wherein the linear movement of the at least one optoelectronic sensor is determined by maximum cross correlation between successive images captured by the at least one optoelectronic sensor.

18. The method of claim 16, wherein the linear movement of the at least one optoelectronic sensor is equal to linear movement of the robotic device.

19. The method of claim 16, further comprises determining linear velocity of the robotic device, by the one or more processors of the robotic device, based on the linear movement of the at least one optoelectronic sensor and the time between the captured images, the linear movement of the at least one optoelectronic sensor being estimated from the captured images.

20. The method of claim 16, further comprises determining angular velocity of the robotic device, by one or more processors of the robotic device, based on the linear movement of the at least one optoelectronic sensor and the time between the captured images, the linear movement of the at least one optoelectronic sensor being estimated from the captured images.

21. The method of claim 16, wherein images captured by the at least one optoelectronic sensor overlaps with preceding images captured by the at least one optoelectronic sensor.

22. The method of claim 16, wherein the rotational movement is about an instantaneous center of rotation located at a center of the robotic device.

23. The method of claim 16, wherein the rotational movement is about an instantaneous center of rotation located at a wheel of the robotic device.

24. The method of claim 16, wherein the driving surface is illuminated by a light source.

25. The method of claim 24, wherein the light source is an LED.

* * * * *